(12) United States Patent
Bailey et al.

(10) Patent No.: US 9,488,668 B2
(45) Date of Patent: Nov. 8, 2016

(54) CYCLE CRANKS, CYCLES, METHODS OF MEASURING A CYCLE CRANK ANGULAR POSITION

(71) Applicant: bf1systems Limited, Diss, Norfolk (GB)

(72) Inventors: John Bailey, Diss (GB); Gavin Mark Skipper, Ely (GB); Kevin James Ireland, Hextable (GB); James Ravi Shingleton, Bridgham (GB)

(73) Assignee: BF1SYSTEMS LIMITED, Diss, Norfolk (GB)

( * ) Notice: Subject to any disclaimer, the term of this patent is extended or adjusted under 35 U.S.C. 154(b) by 811 days.

(21) Appl. No.: 13/719,585

(22) Filed: Dec. 19, 2012

(65) Prior Publication Data

US 2013/0104650 A1 May 2, 2013

Related U.S. Application Data

(63) Continuation-in-part of application No. PCT/GB2012/051960, filed on Aug. 10, 2012.

(30) Foreign Application Priority Data

Aug. 12, 2011 (GB) .................................. 1113865.8

(51) Int. Cl.
  *G01P 15/00* (2006.01)
  *G01P 3/00* (2006.01)
  *B62M 3/00* (2006.01)

(52) U.S. Cl.
  CPC *G01P 3/00* (2013.01); *B62M 3/00* (2013.01); *B62K 2207/00* (2013.01); *B62K 2207/04* (2013.01)

(58) Field of Classification Search
  CPC ...... G01P 3/00; B62M 3/00; B62K 2207/00; B62K 2207/04
  See application file for complete search history.

(56) References Cited

U.S. PATENT DOCUMENTS

| | | | | |
|---|---|---|---|---|
| 4,463,433 A | * | 7/1984 | Hull | A61B 5/221 702/41 |
| 5,027,303 A | * | 6/1991 | Witte | A61B 5/222 482/8 |
| 6,999,799 B1 | * | 2/2006 | Almassy | H04W 52/0216 370/311 |
| 8,065,926 B2 | * | 11/2011 | Meyer | G01L 3/1471 73/862.325 |
| 8,584,529 B2 | * | 11/2013 | Fisher | B62M 3/00 73/760 |
| 8,833,182 B2 | * | 9/2014 | Tetsuka | B62M 3/003 73/862.621 |

(Continued)

FOREIGN PATENT DOCUMENTS

| | | |
|---|---|---|
| EP | 2 058 637 A2 | 5/2009 |
| WO | 2008/058164 A2 | 5/2008 |

(Continued)

*Primary Examiner* — Harshad R Patel
*Assistant Examiner* — Samir M Shah
(74) *Attorney, Agent, or Firm* — Workman Nydegger

(57) ABSTRACT

A cycle crank includes a first portion for attachment to a cycle and a second portion spaced from the first portion for attachment to a pedal; wherein the crank includes a sensor for determining, in use, a value representative of a force applied to the crank; an angular rate sensor for determining, in use, the angular rated of rotation of the crank; and a processor for determining the angular position of the crank from the determined angular rate of rotation and associating the position with its corresponding value representative of a force applied to the crank.

4 Claims, 3 Drawing Sheets

(56) References Cited

U.S. PATENT DOCUMENTS

| | | | | |
|---|---|---|---|---|
| 2006/0160495 A1* | 7/2006 | Strong | ............... | H04B 7/04 455/101 |
| 2010/0024590 A1 | 2/2010 | O'Neill et al. | | |
| 2010/0093494 A1* | 4/2010 | Smith | ............... | B62M 6/50 482/8 |
| 2010/0263468 A1* | 10/2010 | Fisher | ............... | G01L 5/225 74/469 |
| 2012/0330572 A1* | 12/2012 | Longman | ............... | G01L 3/247 702/44 |

FOREIGN PATENT DOCUMENTS

| | | |
|---|---|---|
| WO | 2009/006673 A1 | 1/2009 |
| WO | 2011/030215 A1 | 3/2011 |
| WO | 2011/063468 A1 | 6/2011 |

* cited by examiner

CYCLE CRANKS, CYCLES, METHODS OF MEASURING A CYCLE CRANK ANGULAR POSITION

CROSS-REFERENCE TO RELATED APPLICATIONS

This application is a continuation-in-part of PCT Application No. PCT/GB2012/051960, filed Aug. 10, 2012, which claims priority to United Kingdom Application No. GB 1113865.8, filed Aug. 12, 2011, all of the foregoing applications being incorporated herein by specific reference.

FIELD OF THE INVENTION

The invention relates to cycle cranks, cycles, methods of measuring a cycle crank angular position and computer software configured to operate the method.

The term "cycle" is to be interpreted as any device which incorporates a crank which an operator can rotate by applying a force in an appropriate direction. It may therefore be for example a bicycle, tricycle, a tandem, a pedalo, a buggy, a cart, a hand cycle, a fixed or mobile vehicle incorporating a crank which an operator can rotate by applying a force in an appropriate direction.

BACKGROUND TO THE INVENTION

Measuring the forces which are applied to a crank during a cycling motion is well known. Several methods have been developed to correlate the amount of force and/or torque applied to a crank with its angular position in order for example to assist an athlete in optimising his/her cycling action. An XY hall-effect magnetic sensor and donut magnet have been used to assist in the determination of a crank's angular position. This kind of prior art method requires a complex set up and relatively complex components on both the crank and the frame.

One of the objectives of the invention is to simplify the method of measuring a cycle crank angular position. Another object of the invention in certain aspects is to increase the accuracy of the method. Another object of the invention in certain embodiments is to provide for a system which can be housed within the crank itself and substantially reduce the components which might be external to the crank.

SUMMARY OF THE INVENTION

In a first broad independent aspect, the invention provides a cycle crank comprising a first portion or attachment to a cycle and a second portion spaced from said first portion for attachment to a pedal or handle; wherein said crank comprises a sensor for determining, in use, a value representative of a force applied to said crank; an angular rate sensor for determining, in use, the angular rate of rotation of said crank; and a processor for deriving the angular position of said crank from said determined angular rate of rotation and associating said position with its corresponding value representative of a force applied to said crank.

This configuration is particularly advantageous because it allows the measurement of the angular position of a crank on for example a bicycle without the complexity associated with the prior art. It may for example reduce the components required to a single external indexing magnet whilst the other components necessary for the derivation of the position are each housed within the envelope of the cycle crank. This configuration is also particularly advantageous due to the achievable levels of accuracy.

In a subsidiary aspect, the invention provides a cycle crank comprising a first portion for attachment to a cycle and a second portion spaced from said first portion for attachment to a pedal or handle; wherein said crank comprises a sensor for determining, in use, a value representative of a force applied to said crank substantially throughout a revolution of said crank; an angular rate sensor for determining, in use, the angular rate of rotation of said crank substantially throughout a revolution of said crank; a processor for deriving substantially throughout a revolution of said crank, the angular positions of said crank by integrating said determined angular rates of rotation with respect to time and associating said positions with corresponding values representative of the force applied to said crank substantially throughout a revolution of said crank; and a switch for resetting said integration once per revolution. This configuration is particularly advantageous because it allows in-cycle assessment of the force characteristics under which the crank is submitted. The processor and the sensors may be configured to sample substantially throughout a revolution at a high rate; whereby in-cycle real-time assessment of the force characteristics may be achieved. The data may also be stored for individual cycles for further analysis of the force characteristics at various angles of the cycle.

In a subsidiary aspect, the cycle crank further comprises a wireless transmitter for transmitting signals representative of the force applied to said crank and its corresponding position. This would for example allow the measured force and position to be transmitted to an appropriate wireless receiver for display and/or analysis. This configuration would avoid the need for external wires which by definition would not be practical when secured on a rotating crank.

In a further subsidiary aspect, said crank further comprises a switch for resetting a measurement cycle. This allows the accuracy of the determination of the angular position to be safeguarded from measured cycle to measured cycle.

In a further subsidiary aspect, the cycle crank further comprises a power source; wherein the power source, the wireless transmitter, the force sensor, the angular rate sensor and the processor are each integrated within the body of the crank. This allows the components to determine angular position with accuracy whilst allowing the electronic components to be potentially protected by the body of the crank.

In a further subsidiary aspect, said angular rate sensor is a single axis angular rate sensor with an active axis of rotation being parallel, in use, to the axis of rotation of the crank. The sensitivity of the angular rate sensor is maximised in this configuration in order to provide an improved level of feedback to an operator for assessment.

In a further subsidiary aspect, said angular rate sensor is a multiple axis angular rate sensor from which only the measurements of one axis are employed to derive the angular position. In this configuration, the angular position may be employed for the torque/angular position correlation process mentioned above. Advantageously, other or additional axes of measurement might be employed to assess other angles of rotation.

In a further subsidiary aspect, the processor is configured to process the values obtained from a second angular rate sensor located on the frame of a cycle; and derive said angular crank positions. This is particularly beneficial in order to take into account any pitch of the bicycle during use.

In a second broad independent aspect, the invention provides a cycle, preferably a bicycle which comprises a cycle crank according to any of the preceding aspects.

In a subsidiary aspect, the cycle comprises a second angular rate sensor located on its frame; said second angular rate sensor being positioned to determine the angular rate of pitching of the cycle. This allows any inaccuracy arising from rotation of the frame itself in pitching to be factored out.

In a further subsidiary aspect, the cycle further comprises a wireless transmitter for wirelessly transmitting signals derived from the second angular rate sensor to the processor. This avoids any need to provide wires between the frame and the crank.

In a further subsidiary aspect, the cycle further comprises a first portion of a switch located on the frame and interacting with a second portion of the switch provided as part of the crank; whereby a measurement cycle is reset at a fixed position of the crank relative to the frame. This configuration allows any errors in the integration of the angular rate to be factored out at the beginning of each cycle.

In a third broad independent aspect, the invention provides a method of measuring a cycle crank angular position comprising the steps of determining the angular rate of rotation of a crank, determining a value representative of a force applied to the crank; and deriving the angular position of the crank from the angular rate of rotation; and associating the position with its corresponding value representative of a force applied to the crank.

In a subsidiary aspect, the method further comprises the step of integrating the angular rate of rotation to derive the angular position.

In a further subsidiary aspect, the method further comprises the step of resetting the integration at a fixed indexing position.

In a further subsidiary aspect, the method further comprises the steps of providing a first angular rate sensor as part of the crank and providing a second angular rate sensor as part of the frame of the cycle; and processing values obtained from both said first and second angular rate sensors to derive the angular crank positions.

In a further independent aspect, the invention provides computer software configured to operate the method of any of the preceding aspects.

In a further independent aspect, the invention provides a cycle crank comprising a pair of crank arms, each crank arm comprising a sensor for determining, in use, a value representative of a force applied to the crank arm during a revolution of the crank arm; and a wireless transmitter; wherein both the crank arms are configured to operate in a first mode of operation and in a second mode of operation; in said first mode of operation the wireless transmitters of the crank arms communicate together and in the second mode of operation the wireless transmitters of the crank arms communicate directly to a receiver located remotely from the crank arms.

This configuration is particularly advantageous because it allows switching between modes of operation which allows the transmission to occur successfully even when an additional device is in proximity. It also allows more flexibility in order to allow transmission of more informative data sets at a higher rate or with a greater compatibility with conventional displays when operating at a lower rate.

In a subsidiary aspect, in said first mode of operation the transmitters transmit at a first rate of transmission and in said second mode of operation the transmitters transmit at a second rate transmission; the second rate transmission being higher than the first rate of transmission. This would allow transmission to a bespoke receiver when transmitting at the higher rate whilst providing the option of transmitting data to other kinds of receivers.

In a further subsidiary aspect, the first crank arm incorporates a sensor master channel transmitting data; the first crank arm further incorporating a slave channel for receiving data from the second crank arm containing force or torque data from the second crank arm; whereby the force or torque data from the second crank arm in conjunction with force or torque data and cadence data from the first crank arm allows power to be calculated. This configuration is particularly efficient in determining power whilst taking into account the forces applied to both crank arms.

In a further subsidiary aspect, in a second mode of operation the first crank arm reconfigures its slave channel as a master channel for transmitting data at a higher rate of transmission and a second crank arm transmits data at a higher rate of transmission than in the first mode of operation. This is particularly advantageous in terms of efficiency of reconfiguration.

In a further broad independent aspect, the invention provides a cycle crank comprising at least one crank arm, each crank arm comprising a sensor for determining, in use, a value representative of a force applied to said crank arm during a revolution of said crank arm; and a wireless transmitter; wherein said at least one crank arm is configured to operate in a first mode of operation and in a second mode of operation; in said second mode of operation the wireless transmitter of said crank arm communicates at a higher rate of transmission than in the first mode of operation.

In a subsidiary aspect, said wireless transmitter is configured to transmit in one of three modes of operation at rates of transmission pertaining to three different frequency ranges. This allows operation selectively at a relatively high rate of transmission, a medium rate of transmission, and a relatively low rate of transmission.

In a subsidiary aspect, a first range comprises frequencies lower than 10 Hz. In a preferred embodiment, the rate of frequency is 4 Hz.

In a subsidiary aspect, a second range comprises frequencies of 10 to 150 Hz.

In a subsidiary aspect, a third range comprises frequencies of 150 Hz and greater.

DETAILED DESCRIPTION OF THE FIGURES

Figure 1:
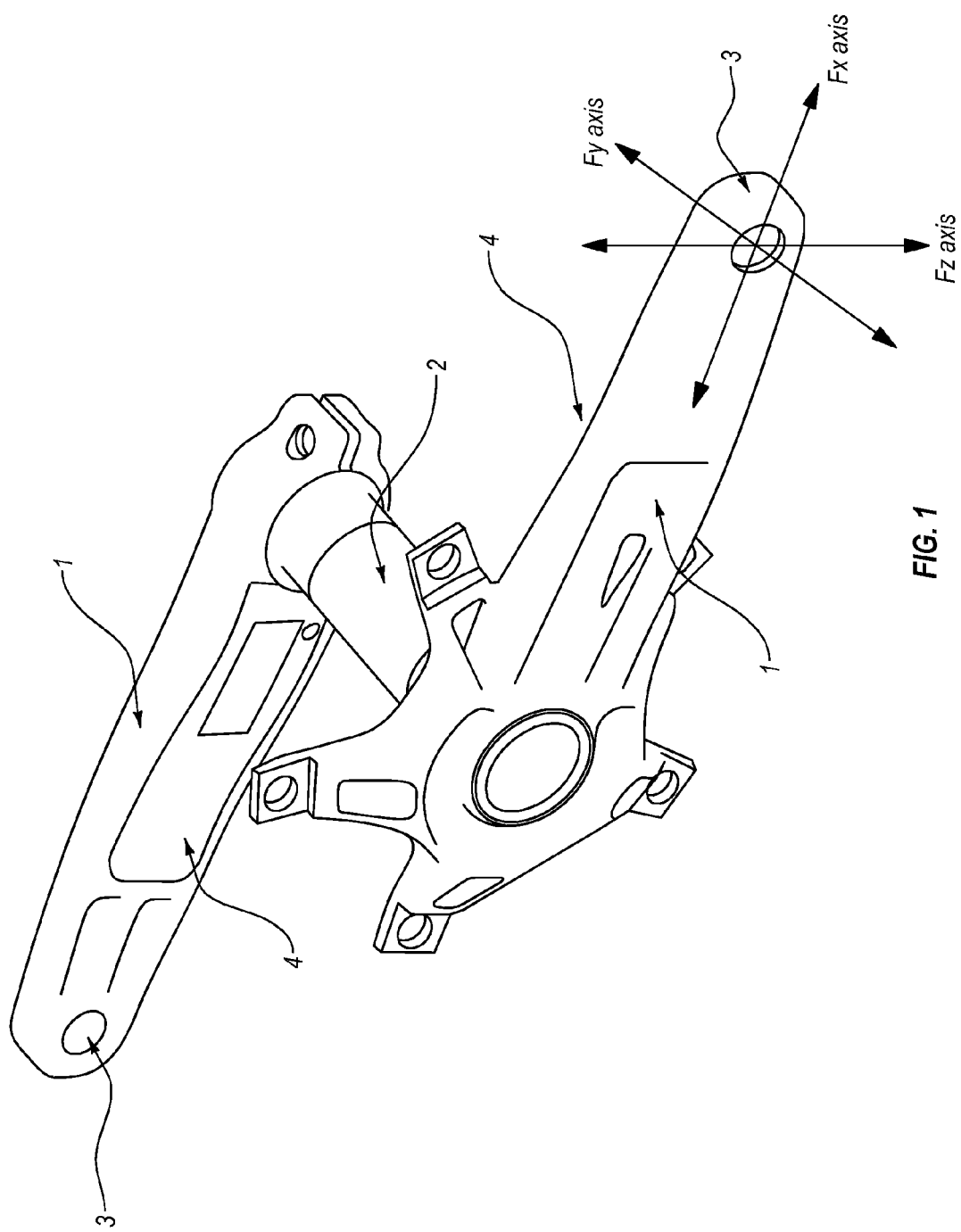
FIG. 1, shows a schematic side view of a crank.
Figure 2:
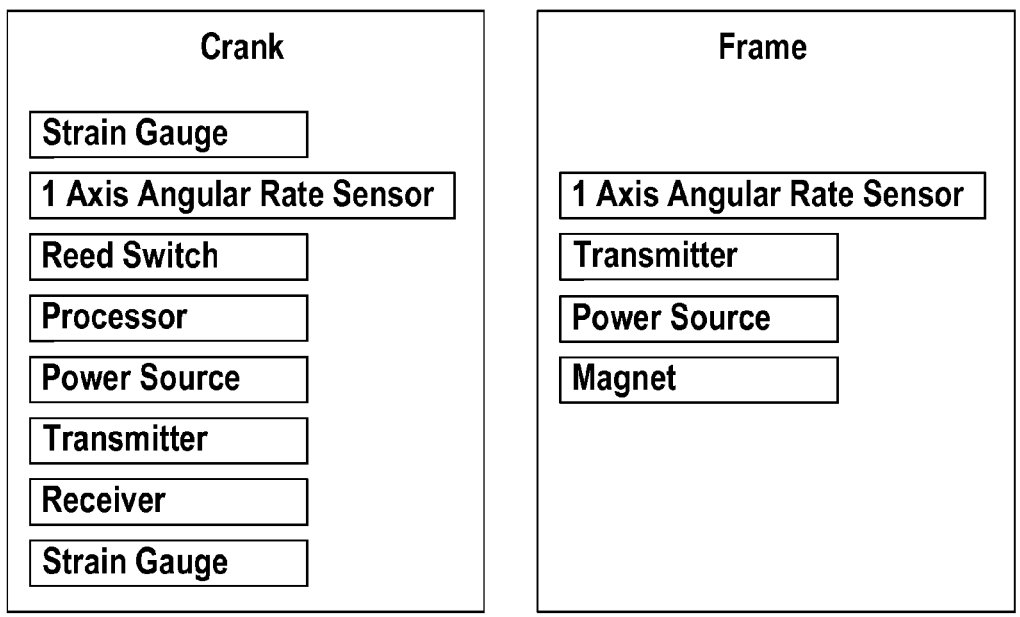
FIG. 2, shows a box diagram with the primary components of a system according to the invention when incorporated into a crank and a frame.
Figure 3:
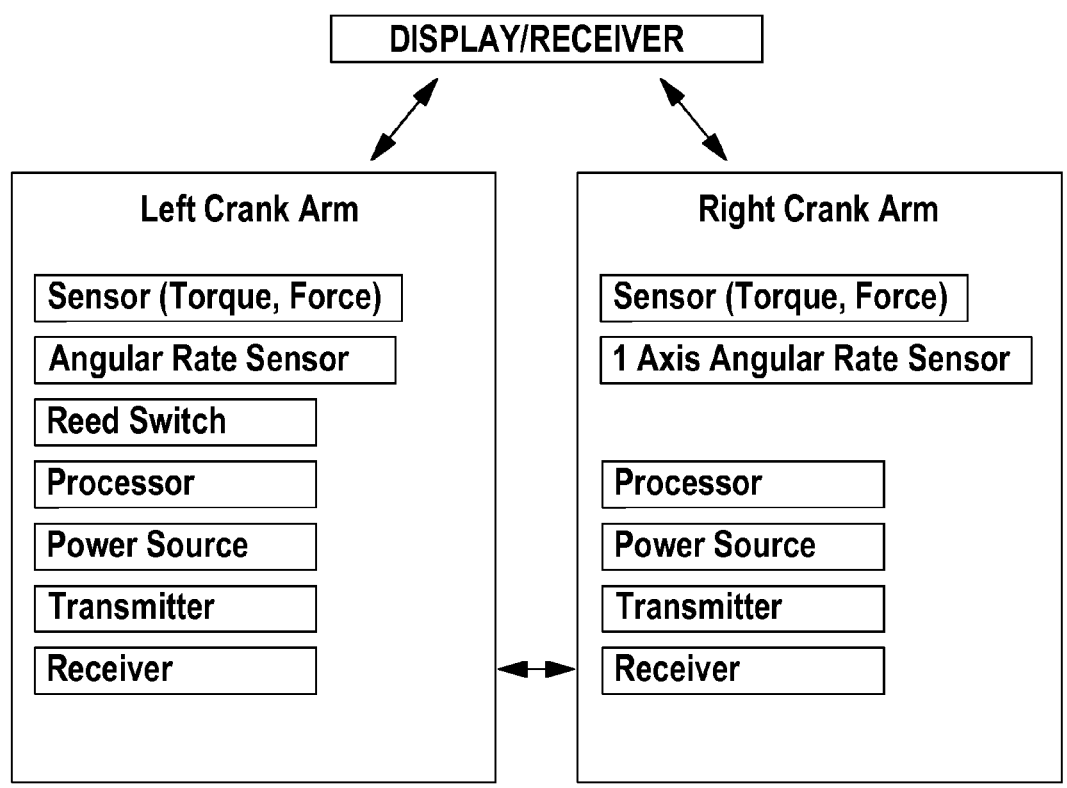
FIG. 3 shows a system of crank arms in box diagram form.

FIG. 1, shows a cycle crank or cycle crank arm 1 comprising a first portion 2 for attachment to a cycle and a second portion 3 spaced from said first portion for attachment to a pedal. The term pedal is to be interpreted broadly and may for example include handles for engagement with an operator's body. At a portion spaced from the first portion 2, a sensor compartment 4 is provided within the envelope of the crank. Within compartment 4 the various crank components shown in FIG. 2 might be housed. In particular, the crank compartment would in a preferred embodiment contain a strain gauge or strain gauges for determining the forces which are applied to the crank. In a preferred embodiment, a strain gauge is provided and oriented in the longitudinal direction (e.g. Fx axis as shown in FIG. 1) of the crank to determine longitudinal forces resulting from the crank being either in tension or in compression. In a further preferred embodiment, a further strain gauge is provided to determine forces in a direction substantially perpendicular to the longitudinal axis (e.g. Fz axis) as the crank is submitted to negative or positive bending in the Fz axis. In a further preferred embodiment, a further strain gauge is provided and oriented in the Fy direction to determine forces resulting from in positive or negative bending in the Fy axis. The strain gauges or other similar sensors are employed to derive the force characteristics substantially throughout each rotation. In a further embodiment, a single two axis force measuring sensor may be employed which measures a downward force component and a torque component which is perpendicular to the downward force component.

In a further embodiment, a three axis force measuring sensor may be employed which measures a downward force component (Fx axis), a torque component (Fz axis) which is perpendicular to the downward force component and a lateral force component (Fy axis), all components being perpendicular to each other.

In addition to the strain gauge or force measuring sensor, a 1-axis angular rate sensor is provided. This angular rate sensor may be referred to as a gyroscope (also known as a gyro). It may for example be a Z axis gyro. A processor would be provided to receive the signals in the form for example of voltages. The processor would be configured to integrate the values representative of angular rate sensed by the 1-axis gyro in order to determine the angular position. This configuration allows the angular positions to be determined substantially throughout each cycle of rotation not only at a single point per revolution as in a conventional cadence sensor. This allows therefore the force characteristics to be determined throughout a revolution and associated with any angle during a revolution. It therefore allows in-cycle analysis rather than cumulative analysis as present in prior art cadence sensors.

In order to determine the start of a cycle on a consistent basis a switch such as a reed switch is provided. As the reed switch passes in close proximity to a magnet on the frame, the reed switch causes the resetting of the integration process in order to minimise the risk of cumulative integration errors from cycle to cycle. In order to drive the various electronic components an appropriate power source is provided. The processed data is then transmitted through a wireless transmitter to an appropriately positioned receiver which might be part of a display. A receiver is provided to allow the processor to take into account the data obtained from further single axis angular rate sensors. The receiver might also be used to change the settings of the processor or other electronic components which might require remote configuration.

In order to take into account the rotation of the bicycle (in particular in a pitch mode of rotation) a second single axis angular rate sensor is provided on the frame. This further single axis angular rate sensor is provided together with a transmitter and a power source to allow the data obtained from the sensor to be transmitted to the processor in order for it to nullify the effects of pitch in the calculation of the primary 1-axis angular rate sensor.

In order to maintain the accuracy of the integration, a magnet might be provided as part of the frame to interact with the reed switch if provided in the crank.

Whilst the provision of a reed switch for resetting at a fixed indexed position around the revolution is an option, further embodiments might include an optical switch, a tilt switch, and a hall-effect sensor. The provision of an optical switch would remove the requirement of providing a magnet on the bicycle frame and is therefore thought to be particularly advantageous.

In an embodiment of a bicycle two crank arms are provided typically 180 degrees apart. The angular position measurement system therefore only needs to be incorporated in one of the arms since if the angle of one of the arms is determined, the angle of the other can be readily determined. The strain gauges or other sensors sensing values representative of a force might however be provided in both crank arms of a bicycle.

The position of the gyro in the crank would typically be at a spaced apart location from the bicycle engaging portion of the crank with the active axis of the rotation of the gyro being parallel to the axis of rotation of the crank.

The gyro might be configured to output an analogue voltage proportional to the angular speed (for example units of degree per second) the gyro output voltage is preferably sampled and integrated with respect to time.

The integration is preferably performed by a microcontroller or processor provided in the crank. The integration of the angular speed with respect to time yields the angle. The integration might be reset once per revolution by a micro-controller in the crank.

The reset is preferably performed at a fixed indexed position for each revolution. In order to do so, a reed switch is fitted to the crank, in a preferred embodiment, whilst a magnet is fitted to the bike frame. The action of the reed switch when sweeping past the magnet is detected by the micro-controller in order to reset the integration process.

Other types of Gyros might be employed such as a dual or tri-axis gyro with one axis being used as above. In a preferred embodiment the gyro has a measurement range of up to 2,000 degrees per second. This range of operation would allow the gyro to comfortably cope with the predicted maximum speed of five revolutions per second.

Crank position may be calculated by integration of the output from the angular rate gyro. The integrator may be reset by the reed switch index position input, as used for average cadence calculation, and may then accumulate the output samples from the angular rate gyro to provide position. Resetting of the integrator on each crank revolution is preferable to prevent accumulation of errors over multiple revolutions.

In this embodiment, the crank position is obtained by summing the gyro output signal over 1 revolution:

$$\Sigma(ADC\_Count_{gyro} - Gyro_{zero\_offset}) * CrankPosition_{factor}$$

$$Gyro_{zero\_offset} = (1.35*4096)/3.0 = 1843 \text{(as for cadence calculation)}$$

In order to provide accurate measurements from the gyro output, it will be necessary to individually calibrate both the zero offset and sensitivity values. (This may not be required if zero offset and/or sensitivity is consistent for an individual device—if this is the case then the zero offset and sensitivity calibration values can be set at hardware build time and left unchanged).

Consider the crank rotating at 60 rpm:

$$Cadence = 60 \text{ rpm}$$
$$= (360*60)/60^0 s^{-1}$$
$$= 360^0 s^{-1}$$

Gyro sensitivity 0.5 mV/$^0$ s$^{-1}$ $$V_{gyro} = 360^0 s - 1$$
$$1.35 + 0.5*360$$
$$1530 \text{ mV}$$

$$ADC\_Count_{gyro} = 4096*(1.530/3.0)$$
$$2088.96$$

At 60 rpm (1rev/sec, 360$^0$ s$^{-1}$):

$$\sum(ADC\_Count_{gyro} - Gyro_{zero\_offset}) = \text{Iteration\_Rate} *$$
$$(ADC\_Count_{gyro} - Gyro_{zero\_offset})$$
$$= 250*(2088.96 - 1843.2)$$
$$= 250*245.76$$
$$= 61440$$

With varying speed the gyro output and number of samples per revolution will vary, the result being a constant value for the end of rotation accumulator. Under default conditions this will be the value calculated above.

To express this in degrees:

$$CrankPosition_{degrees} = CrankPositionAccumulator_{act} / CrankPosition_{factor}$$

Now: 61440 Counts = 360$^0$

Hence: $CrankPosition_{factor} = 61440/360$
$$= 170.67$$

In order to maintain accuracy, whilst using integer arithmetic this can be expressed as 17067 (i.e.: *100)

The position calculation shall be carried out as:

$$CrankPosition_{degrees} = CrankPositionAccumulator_{act} * 1000/CrankPosition_{factor}$$

The parameter CrankPositionAccumulator$_{max}$ and CrankPosition$_{factor}$ shall be held in NV memory (EEPROM). It shall be possible to set these parameters via the ANT based configuration/debug connection. The default value for the parameters shall be:

$CrankPositionAccumulator_{max} = 61440$ $CrankPosition_{factor} = 17067$

The calculation may be carried out using 32-bit integer arithmetic, providing resolution of 0.1$^0$.

In a further embodiment of the invention, a system of co-rotatable crank arms is provided equipped with instruments or sensors to measure the torque and force being applied by the respective left or right leg of a rider of a bicycle. The right and left hand crank arms contain a number of components in common with one another. Each crank arm may in preferred embodiments contain a power source, a transmitter, a receiver, and a force and/or a torque sensor. In this embodiment, the sensor measures the force component in the downward direction (for example at 6 o'clock) and another force component which is also known as the torque which is a force component in a direction substantially perpendicular to the downward force (for example at 3 o'clock). In addition, one of either of the left or right hand crank will contain the angular rate sensor or gyro employed as described in previous embodiments to derive the position of the crank and the cadence. In this embodiment, the angular rate sensor is located in the left hand crank arm only since the left hand crank is located at 180 degrees relative to the right hand crank, the position determined by the angular rate sensor of one of the crank arms is sufficient to determine the position of the other crank arm.

The crank arms incorporate the necessary processing means or processor to allow them to operate in distinct modes. A receiver which may be located remotely from the crank arms on the bicycle may be equipped with means for wirelessly changing the mode of operation of the respective crank arms. An appropriate transmitter of a signal may be provided for this endeavour. In a first mode of operation, the wireless transmitters of the crank arms are configured to communicate together whilst in a second mode of operation, the wireless transmitters of the crank arms are configured to communicate directly to a receiver located remotely from the crank arms.

In a preferred embodiment, each one of the crank arms operates in either ANT+ mode or in ANT mode. Other protocols may be employed as appropriate such as BLUETOOTH 4.0.

In the ANT+ mode, the left crank is configured to operate as the ANT+ sensor master. In this configuration, one of the channels of the left crank may be configured to employ the ANT+ bicycle power device master channel configuration. It may be configured to transmit power data pages interleaved with other data pages (e.g. manufacturer's ID, product information, battery status) at a predetermined interval. In a preferred embodiment, the interval may be set at 15 seconds. The left crank has an additional ANT channel which may be configured as a slave channel capable of receiving data from the right crank. The sampling across this channel may also be at a predetermined rate. The rate of transmission may be for example 8 Hertz. The data received from the right crank may incorporate either torque only or torque and force data. The left crank which is equipped with an angular rate sensor processes the data received from the right crank arm in conjunction with torque and/or force, and cadence data to derive power data. In addition, the processing taking place in the left crank arm may also determine the left/right pedal contribution.

In a second mode of operation, the left and right hand crank arms are configured to operate in a high speed ANT mode. The switching from the ANT+ mode to the ANT mode may be triggered by despatching an ANT command as an acknowledge type message wirelessly to the crank arms. Upon receipt of this message, the respective crank arms will be reconfigured to transmit in a high speed ANT mode instead of an ANT+ mode.

As part of this reconfiguration, the left crank arm will close the ANT+ channel and reconfigure its slave channel, which had previously been receiving data from the right crank arm, to a master channel transmitting and sampling data at a much higher rate. The rate may be predetermined and may for example be up to 192 Hertz. The right crank will increase its data rate from 8 Hertz up to a maximum of 192 Hertz. The data sent from the right crank may be essentially the same as in the first mode of operation. It may however be at a higher rate. With regard to the left crank arm in this configuration it will not transmit ANT+ data pages but rather, amongst others, torque, force, position, cadence and angular velocity data. Both the crank arms will in this mode of operation sample data at a higher rate.

In order to ensure good wireless reception at the receiver, the left and right channels may have distinct parameters within their respective channel ANT configurations. These include widely spaced RF frequencies, different device types, and a device number generated from the respective embedded micro-controllers' serial number.

To exit from this mode and return to the ANT+ mode the left and right crank arms may be configured to receive an acknowledged type message NANT. Additionally, the cranks may be configured to time out of this second mode of operation if they do not receive an ANT message at least once every 30 seconds. Upon exiting the high speed mode the left crank will reopen the ANT+ channel and reconfigure the high speed master channel to a slow speed slave channel to again receive data from the right crank. The right crank arm itself will reduce its transmit rate to a predetermined lower rate which may be for example 8 Hertz. Both crank arms will then reduce their sampling rate to resume operation in the ANT+ mode.

In a further embodiment, the cranks may be used in several different modes of operation dependent on the information that the rider wishes to display and collect during a riding session.

The cranks may be configured to operate first of all in the ANT+ mode. In this mode, power data may be transmitted from the cranks using the ANT+ protocol at a rate of 4 Hz. In this mode of operation, it is expected that the cranks will be compatible with other ANT+ enabled devices which will allow compatibility with ANT+ display devices. Transmission of power data at 4 Hz is advantageous in determining the average power produced whilst pedalling.

When a compatible data logger is brought into close proximity of the cranks, the logger will be configured to detect the presence of the cranks and transmit a configuration command to the cranks instructing them to enter a different operational mode. The mode of operation will be dependent on the rider's requirement for either medium or high speed data.

The high speed data rate mode (high data rate being classed as a data transmitted at a rate >150 Hz). In this mode data from the cranks may be transmitted using the ANT protocol. Crank force (up to 3 axes) and position data will preferably be transmitted at a high rate. Data collected by the logger at this rate allows the rider's pedalling technique to be analysed in great detail as the forces applied at a specific point of the crank position is known.

The medium data rate mode would transmit data at a rate of in the order of 10 Hz to 150 Hz.). In this mode data from the cranks may be transmitted using the ANT protocol. Crank force (up to 3 axes) and position data may be transmitted at a medium rate. Data collected by the logger in this mode allows the riders pedalling technique to be analysed (albeit with less resolution of data than the high speed mode). On of the further benefits of a lower data rate for certain applications will be an increase in the sensor's battery life.

The invention claimed is:

1. A cycle crank comprising:
at least one crank arm, each crank arm comprising:
a sensor for determining, in use, a value representative of a force applied to said crank arm during a revolution of said crank arm; and
a wireless transmitter;
wherein said at least one crank arm is configured to operate in a first, low speed mode of operation in a first frequency range, in a second, medium speed mode of operation in a second frequency range, and in a third, high speed mode of operation in a third frequency range;
in said second mode of operation the wireless transmitter of said crank arm communicates at a higher rate of transmission than in the first mode of operation; and
in the third mode of operation the wireless transmitter of said crank arm communicates at a higher rate of transmission than in the first and second modes of operation.

2. A cycle crank according to claim 1, wherein the first frequency range comprises frequencies lower than 10 Hz.

3. A cycle crank according to claim 2, wherein the second frequency range comprises frequencies of 10 to 150 Hz.

4. A cycle crank according to claim 3, wherein the third frequency range comprises frequencies of 150 Hz and greater.

* * * * *